United States Patent

Das et al.

[11] Patent Number: 5,109,078
[45] Date of Patent: * Apr. 28, 1992

[54] CYANATO GROUP CONTAINING PHENOLIC RESINS, PHENOLIC TRIAZINES DERIVED THEREFROM

[75] Inventors: Sajal Das, Parsippany; Dusan C. Prevorsek, Morristown, both of N.J.

[73] Assignee: Allied-Signal Inc., Morris, N.J.

[*] Notice: The portion of the term of this patent subsequent to May 16, 2006 has been disclaimed.

[21] Appl. No.: 678,470

[22] Filed: Apr. 1, 1991

Related U.S. Application Data

[62] Division of Ser. No. 317,385, Mar. 1, 1989, Pat. No. 5,004,788.

[51] Int. Cl.$^5$ .................. C08G 8/28; C08L 61/06
[52] U.S. Cl. .................. 525/504; 528/142; 528/146; 528/162; 428/422.8; 428/423.1; 428/704
[58] Field of Search .................. 525/504; 528/162

[56] References Cited

U.S. PATENT DOCUMENTS

| | | | |
|---|---|---|---|
| 3,448,079 | 6/1969 | Grigat et al. | 525/504 |
| 4,022,755 | 5/1977 | Tanigaichi et al. | 525/504 |
| 4,831,086 | 5/1989 | Das et al. | 528/162 |
| 4,851,279 | 7/1989 | Das et al. | 528/162 |
| 4,970,276 | 11/1990 | Das et al. | 528/162 |
| 4,978,727 | 12/1990 | Das et al. | 528/162 |
| 4,988,780 | 1/1991 | Das et al. | 528/162 |
| 5,004,788 | 4/1991 | Das et al. | 528/162 |

FOREIGN PATENT DOCUMENTS 58-34822 3/1983 Japan.
59-149918 8/1984 Japan.

*Primary Examiner*—John C. Bleutge
*Assistant Examiner*—Frederick Krass
*Attorney, Agent, or Firm*—R. C. Stewart, II; G. H. Fuchs; D. L. Webster

[57] ABSTRACT

The present invention is a cyanato group containing phenolic resin of the formula:

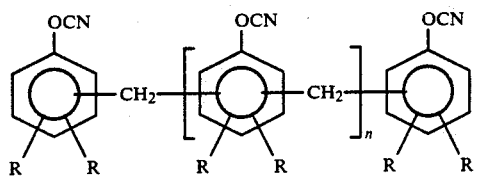

wherein n is 0 or an integer of one or more, and R is the same or different and is selected from the group consisting of hydrogen and methyl radicals. The advancement over the art is that the resin of the present invention is stable and has a long shelf life. This is indicated by the gel time of greater than 1 minute, preferably greater than 2 minutes, more preferably greater than 10 minutes, and most preferably greater than 20 minutes at 155° C. Alternately, the improved resin of the present invention can be characterized as having a thermal stability indicated by thermal decomposition temperature of at least 400° C. and preferably of at least 450° C. as measured by Thermal Gravimetric Analysis (TGA).

31 Claims, No Drawings

CYANATO GROUP CONTAINING PHENOLIC RESINS, PHENOLIC TRIAZINES DERIVED THEREFROM

This application is a division of application Ser. No. 317,385, filed Mar. 1, 1989, now U.S. Pat. No. 5,004,788.

The present invention is in the field of phenol based resins. More particularly, the present invention relates to a cyanato group containing phenolic resin, also known as phenolic cyanate resin, a method to prepare that resin, and phenolic triazine resins derived therefrom.

Cyanato group containing phenolic resins have been described in U.S. Pat. Nos. 3,448,079 and 4,022,755 as well as in Delano, et al, *Synthesis of Improved Phenolic Resins*, Acurex Corp/Aerotherm, Acurex Vinyl Report 79-25/AS, Sept. 4, 1979 prepared for NASA Lewis Research Center, Contract No. Nas3-21368, and is available through the United States Department of Commerce National Technical Information Service.

A recent reference, Heat Resistance Polymers by Critchley, et al, pp. 406–408 Plenum Press, New York, 1986 has described phenolic triazine resins prepared from phenolic novolac or meta-cresol novolac which have essentially the same chemical structures as described in the above referenced patents.

The phenolic triazines which have been disclosed have been found to have high thermal stability. However they have not been commercially produced because of poor shelf life, and very short reaction times. They have high water absorption and relatively poor adhesion stream. It has been found as illustrated below, that reproduction of the phenolic cyanate ester resins disclosed in the art are unstable and not suitable for commercial applications such as matrix for various composites, impregnation media for paper and nonwovens, adhesives, coatings, etc. When these unstable resins are converted into a crosslinked product (phenolic triazines) mechanical properties have been observed to be poor. The cured resins are so brittle, that frequently a suitable test sample for property determination cannot be fabricated. It has been found that curing the phenolic cyanate ester resins prepared according to the disclosures in the art, generates smoke and volatile chemicals.

Phenolic cyanate resins have, according to their structural potential to form crosslinking products with outstanding thermal, oxidative stability as well as very high char yield upon heating to very high temperatures (900°–1,000° C.). However, resins prepared according to the teachings in the art have failed to yield products with these mechanical and thermal properties. The present invention overcomes the shortcomings that have held back this potentially valuable resin from widespread commercial use.

SUMMARY OF THE INVENTION

The present invention is a cyanato group containing phenolic resin of the formula:

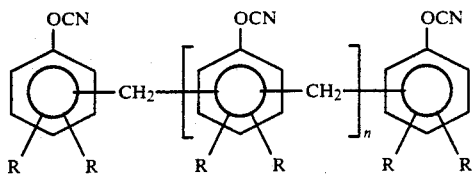

wherein n is 0 or an integer of one or more, and R is the same or different and is selected from the group consisting of hydrogen and methyl radicals. The advancement over the art is that the resin of the present invention is stable and has a long shelf life. This is indicated by the gel time of greater than 1 minute, preferably greater than 2 minutes, more preferably greater than 10 minutes at 155° C., and most preferably greater than 20 minutes at 155° C. Alternately, the improved resin of the present invention can be characterized as having a thermal stability indicated by thermal decomposition temperature of at least 400° C. and preferably of at least 450° C. as measured by Thermal Gravimetric Analysis (TGA).

It is believed that the improved properties attained by the cyanate group containing phenolic resin of the present invention result from the resin having low residual amounts of dialkyl cyanamide which is typically a diethyl cyanamide. There is preferably less than 2% by weight, more preferably less than 1% by weight, and most preferably substantially no dialkyl cyanamide. Triethyl amine reacts with the cyanogen halide to form diethyl cyanamide. This side reaction is an undesirable waste of the reactants. This side reaction can be minimized by conducting the reaction to form the cyanato group containing phenolic resins at from −5° C. to −45° C. Traces of dialkyl cyanamide formation during the cyanation reaction can be removed by purification, typically during precipitation.

An additional embodiment of the present invention is one where the residual amounts of phenyl cyanate is less than 2% by weight and preferably less than 1% by weight and most preferably 0.5% by weight.

The cyanato group containing phenolic resin of the present invention preferably has a number average molecular weight of from about 320 to about 1500, preferably about 500 to 1000 and more preferably about 600 to 1000.

The present invention includes a phenolic triazine resin derived from the cyanato group containing phenolic resin described above. Typically the phenolic triazine is formed by heating the cyanato group containing phenolic resin.

The present invention includes an improved method of making the cyanato group containing phenolic resin of the formula:

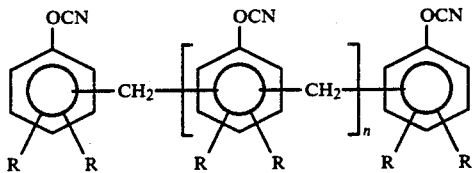

wherein n is 0 or an integer of one or more, and R is the same or different and is selected from hydrogen and methyl groups. The improvement of the method of the present invention is that the cyanato group containing phenolic resin is formed by first reacting novolac resin and a base, preferably trialkyl amine in a cyclic ether solvent to form a trialkylammonium salt of novolac. This step is then followed by reacting the trialkylammonium salt with a cyanogen halide in the cyclic ether to form the cyanato group containing phenolic resin. It is particularly preferred to conduct the reaction at a temperature below about −5° C. and preferably from −5° C. to −45° C., more preferably −5° C. to −10-30° C. and most preferably −15° C. to −30° C.

DESCRIPTION OF THE PREFERRED EMBODIMENTS

The present invention is a cyanato group containing phenolic resin; a phenolic triazine resin derived therefrom; and a method to make the cyanato group containing phenolic resin of the present invention. The cyanato group containing phenolic resin of the present invention has improved gel time and long shelf life. It has low volatiles, and excellent char yield and thermal properties.

The cyanato group containing phenolic resin of the present invention has the formula:

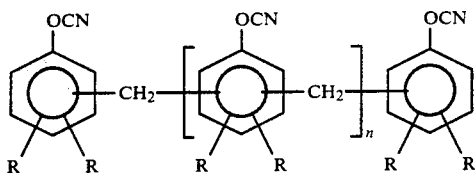

wherein n is 0 or an integer of one or more; and R is the same or different and is selected from hydrogen and methyl groups. The resin has a gel time of greater than 1 minute, preferably 2 minutes, more preferably greater than 10 minutes, and most preferably greater than 20 minutes at 155° C.

An alternate way of measuring the improvement of the present invention is by the resin being capable of forming a phenolic triazine resin having the thermal stability of at least 400° C. and preferably of at least 50° C. as measured by Thermal Gravimetric Analysis (TGA). The phenolic triazine resin of the present invention has a char value at 900° C. of at least 50% by weight, preferably from 50 to 70% by weight, and more preferably 60 to 70% by weight.

It is believed that the improved properties of the resin of the present invention are attributed to the resin having a residual amount of a dialkyl cyanamide, typically diethyl cyanamide of less than 2% by weight, preferably less than 1% by weight and most preferably substantially none. The diethyl cyanamide is undesirable because it generates smoke upon curing.

Preferably the cyanato group containing phenolic resin has a residual amount of phenyl cyanate of less than 2% by weight and preferably less than 1% by weight and most preferably less than 0.5% by weight. This is desirable since it has been found that the phenol cyanate is a volatile material that contributes to thermal instability and the formation of smoke during curing of the resin.

The present invention includes a method to make the cyanato group containing phenolic resin recited above. This involves the steps of reacting novolac resin and a trialkyl amine in a cyclic ether solvent to form the trialkylammonium salt of novolac. This is followed by reacting the trialkylammonium salt with a cyanogen halide in the cyclic ether to form the cyanato group containing phenolic resin. The method is conducted at a temperature range of below −5° C., preferably from −5° C. to −45° C., more preferably from −5° C. to −30° C. and most preferably from −15° C. to −30° C.

The reaction product is in solution in the cyclic ether. This reaction product is a cyanato group containing phenolic resin. It is separated from the solution by a suitable separation technique. The preferred technique is precipitation into a non solvent vehicle. Useful nonsolvents are alcohols with isopropanol being preferred. The separation is preferably conducted at atmospheric pressure. While it can be conducted at room temperature, the temperature is typically from −0° C. to −45° C., preferably −5° C. to −25° C. Precipitation is preferably conducted with agitation.

The method of the present invention results in a cyanato group containing phenolic resins having an unexpected improvement over the art. This is believed to result from the order of the addition of the reactants. The prior art describes making cyanato containing phenolic resins by adding a trialkyl amine to a solution of a novolac resin and a cyanogen halide. The prior art does not recognize the importance of reacting the novolac resin in a trialkyl amine prior to adding the cyanogen halide nor the importance of using a cyclic ether as the solvent. The prior art method is described as adding trialkyl amine to a mixture of novolac resin in cyanogen bromide. This tends to form a diethyl cyanamide which consumes the triethyl amine. It also creates instability and high boiling impurities which are difficult to remove.

The cyanato group containing phenolic resin of the present invention is satisfactory and results in satisfactory cured triazine materials regardless of molecular weight. The preferred molecular weight range is a number average molecular weight of 320 to about 1500, more preferably about 500 to 1000 and most preferably from about 700 to 1000. The molecular weight distribution and number average molecular weight of the cyanato group containing phenolic resin can be determined by gel permeation chromatography (GPC) using tetrahydrofuran as a solvent.

The cyanato group containing phenolic resins forms a phenolic triazine network upon heating and/or in the presence of a curing agent. Typical curing conditions are from 150 to 250° C. under 300 to 500 psi for .1 to 1 hour depending on sample size. The high density of cross linkage of the cured products results in excellent characteristics including thermal properties and a glass transition temperature of 300° C. or higher.

The cyanato group containing phenolic resin of the present invention is derived from a phenolic novolac. Useful phenolic novolac resins are known in the art. A typical and useful one is disclosed in U.S. Pat. No. 4,022,755 at column 2 beginning at line 27. Particularly useful phenols include phenol, cresol and xylenol.

The cyanato group containing phenolic resin of the present invention has a gel time measured by the Hot Plate Stroke Cure Method (see Examples) of greater than 10 minutes at 155° C., and preferably greater than 20 minutes at 155° C. The cyanato group containing phenolic resin of the present invention should be capable of forming a triazine resin have the thermal stability of at least 400° C., and preferably at least 450° C. as measured by Thermal Gravimetric Analysis.

The stability of the resin of the present invention results in part from the method of the present invention which results in a minimum of residual impurities which result in thermal instability and short gel time so as to have short shelf life. The resin should have a residual amount of diethyl cyanamide of less than 2% by weight, preferably less than 1% and more preferably none.

Another impurity that is detrimental is phenol cyanate. This is a volatile material which results in smoke and volatile chemicals during curing. The resin should have a residual amount of phenol cyanate of less than 2% by weight and preferably less than 0.5% by weight.

The present invention includes a method to make the cyanato group containing phenolic resin as described above. The improved properties of the resin of the present invention are due to reacting the novolac resin and a trialkyl amine in a cyclic ether solvent to form the trialkylammonium salt of novolac resin this is followed by reacting the trialkylammonium salt with a cyanogen halide in the cyclic ether to form the cyanato group containing phenolic resin. The reaction is conducted at below about $-5°$ C., preferably to $-5°$ C. to $-45°$ C., more preferably from $-5°$ C. to $-30°$ C. and most preferably from $-15°$ C. to $-30°$ C.

The cyclic ether solvent has been found to be an important reaction medium to form the cyanato group containing phenolic resin of the present invention. The cyclic ether solvent is preferably selected from the group consisting of: tetrahydrofuran; 1,4 dioxan; and furan. The trialkyl amine can be selected from triethyl amine, tripropylamine and triethylcyclohexyl amine. Additionally, the reaction medium can contain other bases to control the pH to help control the rate of the reaction.

The relative amounts of solvent i.e. tetra-hydrofuran, trialkylamine, and phenolic resin used should be controlled to control gel time of the cyanato group containing phenolic resin. Concentrations can be measured as a function of the weight percent of the trialkyammonium salt which could theoretically be calculated based on the weight of the trialkylamine, phenolic resin and solvent. Preferably, the amount of trialkylammonium salt is from 5 to 35, more preferably 10 to 25, and most preferably from 10 to 20 percent by weight. The preferred concentration can vary depending on the specific solvents and reactants used.

The present cured cyanato group containing phenol resin has a wide range of applications such as manufacture of surface coating materials, cast plastics, adhesives, laminates, and molding materials. The resin may be used as is or in combination with other cyanic esters, other polymers, fillers or reinforcing materials, or catalysts.

Several examples are set forth below to illustrate the nature of the invention and method of carrying it out. However, the invention should not be considered as being limited to the details thereof. All parts are by weight unless otherwise indicated.

EXAMPLE 1

Preparation of the Phenolic Cyanate Resin

A mixture of 204 g of novolac (613 number average molecular weight) and 212 g triethylamine was dissolved in one liter of tetrahydrofuran at ambient temperature to form a triethyl ammonium salt of novolac. A 240 g sample of cyanogen bromide was dissolved in one liter of tetrahydrofuran under nitrogen atmosphere. The solution containing the triethylammonium salt of novolac was added to cyanogen bromide solution with a average addition rate 7-8 ml/min. During the addition, the temperature of the reaction mixture was maintained at $-20$ to $-30°$ C. After the reaction was completed, the reaction mixture was stirred for additional one hour and the temperature of reaction mixture rose to $+10°$ C. The product was isolated by filtration to remove triethylammonium salt. The filtrate was purified by precipitation in a cold isopropanol/dry ice mixture ($-15°$ C. to $-20°$ C) (twice), and subsequently dried in a vacuum over overnight to produce an off white phenolic cyanate resin. Elemental analysis indicated: wt.% C=73.5(73wt.%), wt%. of H=4.0(3.82) and wt.% of N=10.6(10.7). The numbers in parenthesis are theoretical, based on the empirical formula $C_8H_5NO$ for a cyanato group containing phenolic resin where R is H. The IR Spectrum indicated absorption at $-C\equiv N$ (22.50(m$^{-1}$)) and absence of any carbamate. Gas chromatograph analysis showed absence of diethyl cyanamide.

EXAMPLE 2

Example 1 was repeated except that the novolac used had a 980 number average molecular weight. The triethylammonium salt of novolac was added to the cyanogen bromide solution over a period of three hours with an average addition rate of 7-8 ml/min. The reaction mixture was maintained at $-30°$ C. Otherwise the conditions of Example 2 were identical to that of Example 1.

EXAMPLE 3

Example 1 was again repeated except that a mixture of 50 grams of novolac (613 number average molecular weight) and 51.0 grams of triethylamine was dissolved in 160 grams of tetrahydrofuran at ambient temperature to form the triethyl ammonium salt. 57.7 grams of cyanogen bromide was dissolved in 135 grams of tetrahydrofuran under nitrogen atmosphere. The solution containing the triethylammonium salt of novolac was added to cyanogen bromide solution over a period of one hour. During the addition the temperature of the reaction mixture was maintained at from $-10$ to $-15°$ C. The procedure of Example 1 was then followed.

COMPARATIVE 1

Example 3 was repeated except that a mixture of 50 grams of novolac (613 number average molecular weight) and 51.0 grams of triethylamine was dissolved in 80 grams of tetrahydrofuran at ambient temperature to form the triethylammonium salt. 57.7 grams of cyanogen bromide was dissolved in 135 grams of tetrahydrofuran under nitrogen atmosphere. The procedure of Example 3 was followed.

COMPARATIVES FROM PATENTS

Example 1 of U.S. Pat. No. 3,448,079 and Examples 1, 3 and 4 of U.S. Pat. No. 4,022,755 were repeated.

SAMPLE TESTING

Measurements were made to determine the gel time of the cyanato containing phenolic resins produced by Examples 1 through 3 of the present invention as well as the comparative examples. The samples were tested for gel time using the following procedure:

Apparatus
Stop watch
0-250° C. thermometer
Electric hot plate, adjusted to 155±1° C. and enclosed in a wind shield 4" Spatula Method 1. For powdered resins: Weigh out a 1.0 gram sample on a watch glass.
2. Quickly dump the complete sample on the center surface of the hot plate and at the same time start the stop watch.
3. Using a 4" spatula spread the resin over a 2 inch square area in the center of the hot plate and stroke the entire area with the spatula at a rate approximating 80 strokes per minute. Without stopping the watch, note the time it took for the resin to melt.
4. Continue stroking, keeping the blade of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within ±5 seconds.

Smoke generation was a visual observation during testing of gel time. The percent diethyl cyanamide was measured by Gel Permeation Chromatography (GC). The results are summarized in Table 1:

TABLE 1

| Example | Gel Time (min) | Smoke | Diethyl Cyanamide wt % by GC |
|---|---|---|---|
| Example 1 | 20-30 | No | None |
| Example 2 | 8-10 | No | None |
| Example 3 | 2-3 | No | None |
| U.S. Pat. Ex. 1 (3,448,079) | Instant- no clear melting point | Smoke | 8 |
| U.S. Pat. Ex. 1 Smoke (4,022,755) | 8 Min. | Heavy | 5-7 |
| U.S. Pat. Ex. 3 Smoke (4,022,755) | 5.5-6 Min | Mild | 4.25 |
| U.S. Pat. Ex. 4 Smoke (4,022,755) | 15 Min. | Heavy | — |

The effect of the triethylammonium salt concentration on gel time was also reviewed. The concentration of triethylammonium salt is calculated based on the quantities of novolac resin, triethyl amine and THF. The results are summarized in Table 2.

TABLE 2

Effect of Salt Concentration on Gel time

| Example | Salt concentration wt (%) | Gel time (min) |
|---|---|---|
| Ex. 1 | 15 | 20-30 |
| Ex. 3 | 20 | 2-3 |
| Comp. 1 | 40 | Product gelled in reactor |

Thermal properties were measured according to thermal gravimetric analysis (TGA) and dynamic mechanical analysis (DMA). TGA was conducted in an argon atmosphere to determine the weight loss of a sample as a function of temperature. About a 30 milligram sample was heated at a 10° C./min. and weight loss measured. The sample was heated up to 900° C. in argon and the residue remaining at 900° C. is considered to be clean. Glass transition temperature was determined on a 4 cm × 1 cm × 0.3 cm thick plague by Dynamic Mechanical Analysis. The sample was heated at a rate of 3° C. per minute and the frequency was 1 hertz. Results are summarized in Table 3.

TABLE 3

| Example (DMA) | Polymer Decomposition Temperature, °C. (TGA) | % Char at 900° C. | Tg °C. (DMA) |
|---|---|---|---|
| Example 1 | 450 | 67 | >300 |
| Example 2 | 470 | 69 | >300 |
| Example 3 | 450-400 | 65-67 | — |
| U.S. Pat. Ex. 1 (3,448,079) | 300-400 | 47 | — |
| U.S. Pat. Ex. 1 (4,022,755) | 420-430' | 56 | — |
| U.S. Pat. Ex. 3 (4,022,755) | 420-430' | 53 | — |

'lost 16% by weight below 400° C. (believed to be from low molecular weight impurities)

While exemplary embodiments of the invention have been described, the true scope of the invention is to be determined from the following claims:

What is claimed:

1. A phenolic triazine resin derived from a cyanato group containing phenolic resin of the formula:

$$\begin{array}{c}\text{OCN}\\ \phantom{x}\\ \text{R} \quad \text{R}\end{array} - \text{CH}_2 - \left[ \begin{array}{c}\text{OCN}\\ \phantom{x}\\ \text{R} \quad \text{R}\end{array} - \text{CH}_2 - \right]_n \begin{array}{c}\text{OCN}\\ \phantom{x}\\ \text{R} \quad \text{R}\end{array}$$

wherein n is 0 or an integer of 1 or more,
R is the same or different and is selected from hydrogen and methyl groups, the resin having a % char yield of greater than about 56% by weight on heating a 30 mg sample of said phenolic triazine resin from about 20° C. to a temperature of 900° C. under argon at a heating rate of 10° C./min, wherein the % char is the residue remaining at 900° C. as a percentage of said 30 mg sample.

2. The resin of claim 1 wherein the % char is at least about 60% by weight of the sample.

3. The resin of claim 2 wherein the % char is from about 60 to about 70% weight of the sample.

4. The resin of claim 3 wherein said cyanato group containing phenolic resin has a number average molecular weight of from about 320 to about 1500 as determined by gel permeation chromatography using tetrahydrofuran as a solvent.

5. The resin of claim 4 wherein said number average molecular weight is from about 500 to about 1000.

6. The resin of claim 4 wherein said number average molecular weight is from about 600 to about 1000.

7. The resin of claim 4 wherein said number average molecular weight is from about 700 to about 1000.

8. The resin according to claim 4 wherein R is hydrogen.

9. The resin according to claim 4 wherein R is methyl.

10. The resin according to claim 4 having a thermal stability of at least about 400° C. as measured by Thermal Gravimetric Analysis.

11. The resin according to claim 10 wherein said thermal stability is at least about 450° C.

12. The resin according to claim 10 wherein R is hydrogen.

13. The resin according to claim 10 wherein R is methyl.

14. The resin according to claim 1 wherein said phenolic triazine resin further comprises one or more fillers or reinforcing materials.

15. An article of manufacture having body formed totally or in part from a phenolic triazine resin derived from a cyanato group containing phenolic resin of the formula:

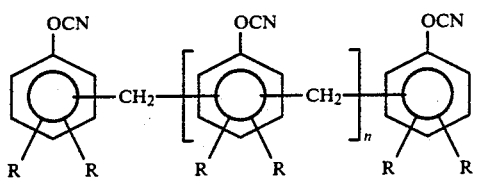

wherein n is 0 or an integer of 1 or more,
R is the same or different and is selected from hydrogen and methyl groups, the resin being capable of forming phenolic triazine resin having a % char yield of greater than about 56% by weight on heating a 30 mg sample of said phenolic triazine resin from about 20° C. to a temperature of 900° C. under argon at a heating rate of 10° C./min, wherein the % char is the residue remaining at 900° C. as a percentage of said 30 mg sample.

16. The article of claim 15 wherein the % char is at least about 60% by weight of sample.

17. The article of claim 15 wherein the % char is at least about 60% by weight of the sample.

18. The article of claim 17 wherein said cyanato group containing phenolic resin has a number average molecular weight of from 320 to about 1500 as determined by gel permeation chromatography using tetrahydrofuran as a solvent.

19. The article of claim 18 wherein said number average molecular weight is from about 500 to about 1000.

20. The article of claim 19 wherein said number average molecular weight is from about 600 to about 1000.

21. The article of claim 18 wherein said number average molecular weight is from about 700 to about 1000.

22. The article of claim 18 wherein R is hydrogen.

23. The article of claim 18 wherein R is methyl.

24. The article of claim 18 having a thermal stability of at least about 400° C. as measured by thermal gravimetric analysis.

25. The article of claim 24 wherein said thermal stability is at least about 450° C.

26. The article of claim 24 wherein R is hydrogen.

27. The article of claim 24 wherein R is methyl.

28. The article of claim 15 wherein said phenolic triazine resin further comprises one or more fillers or reinforcing materials.

29. The article of claim 2 wherein said body comprises a substrate having said phenolic triazine resin coated on all or a portion thereof.

30. The article of claim 15 wherein said body is a laminate of two or more layers at least one of which is formed totally or in part from said phenolic triazine resin.

31. The article of claim 15 wherein said body comprises two parts joined together by an adhesive, wherein said adhesive is said phenolic triazine resin.

* * * * *